United States Patent [19]
Morris, Jr.

[11] Patent Number: 5,626,776
[45] Date of Patent: May 6, 1997

[54] FLANGELESS FUEL TANK

[75] Inventor: H. Edward Morris, Jr., Northville, Mich.

[73] Assignee: Morris Holmes & Co., Novi, Mich.

[21] Appl. No.: 463,918

[22] Filed: Jun. 5, 1995

Related U.S. Application Data

[62] Division of Ser. No. 140,664, Oct. 21, 1993, Pat. No. 5,454,480.

[51] Int. Cl.$^6$ .......................... B23K 26/00; B65D 90/04; B65D 6/32; B65D 8/22
[52] U.S. Cl. ................. 219/121.64; 219/121.63; 220/421; 220/680; 220/689
[58] Field of Search .............. 219/121.6, 121.63, 219/121.64, 121.85, 61.3, 64; 220/4.14, 4.12, 4.21, 612, 678, 680, 689

[56] References Cited

U.S. PATENT DOCUMENTS

| | | | |
|---|---|---|---|
| 1,995,616 | 3/1935 | Kamack | 220/680 |
| 3,712,497 | 1/1973 | Jones . | |
| 3,769,117 | 10/1973 | Bowen et al. | 219/121.6 |
| 3,864,813 | 2/1975 | Morjan . | |
| 3,881,084 | 4/1975 | Baardsen . | |
| 3,969,604 | 7/1976 | Baardsen . | |
| 4,642,446 | 2/1987 | Pennington . | |
| 4,682,002 | 7/1987 | Delle Piane et al. | 219/121.64 |
| 4,684,779 | 8/1987 | Berlinger et al. . | |
| 4,833,295 | 5/1989 | Locker et al. . | |
| 4,847,467 | 7/1989 | Ausilio . | |
| 4,916,284 | 4/1990 | Petrick | 219/121.64 |
| 5,104,032 | 4/1992 | Spies et al. | 228/173.6 |
| 5,129,544 | 7/1992 | Jacobson et al. | 220/562 |
| 5,217,140 | 6/1993 | Lindahl | 220/453 |

FOREIGN PATENT DOCUMENTS

| | | |
|---|---|---|
| 62-192287 | 8/1987 | Japan . |
| 63-108979 | 5/1988 | Japan . |
| 9011161 | 4/1990 | WIPO . |

OTHER PUBLICATIONS

Stanley L. Ream, "Laser Welding of Zinc Coated Steel, Reviewed" (Southfield, Michigan Jun. 5, 1991).
R. Akhter, "Laser welding of zinc coated steel", pp. 195–206 (Date unknown).
J. Hayden, "Laser Welding of Zinc Coated Steel" (Date unknown).
Ralf Imhoff, "Car Body Welding with Laser Radiation", pp. 651–654 (Date unknown).

*Primary Examiner*—Teresa J. Walberg
*Assistant Examiner*—J. Pelham
*Attorney, Agent, or Firm*—Warner Norcross & Judd

[57] ABSTRACT

A flangeless fuel tank formed of two interfitted cup-shaped tank halves welded along the overlapping portion of the tank halves. Locating protrusions stamped into each tank half provide registration of the halves prior to welding. Spacing dimples stamped into at least one of the fuel tank halves provide a vent space for escaping gases from vaporized coatings.

10 Claims, 2 Drawing Sheets

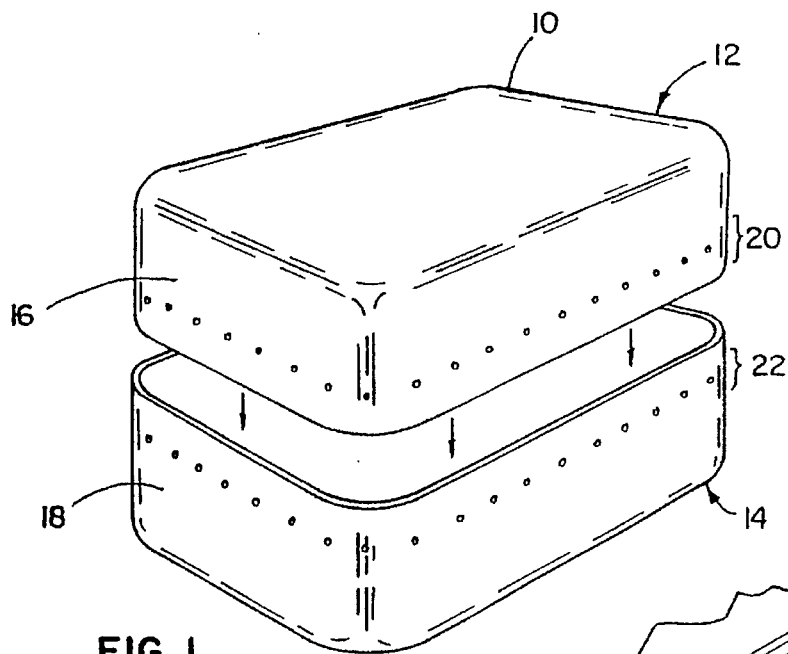
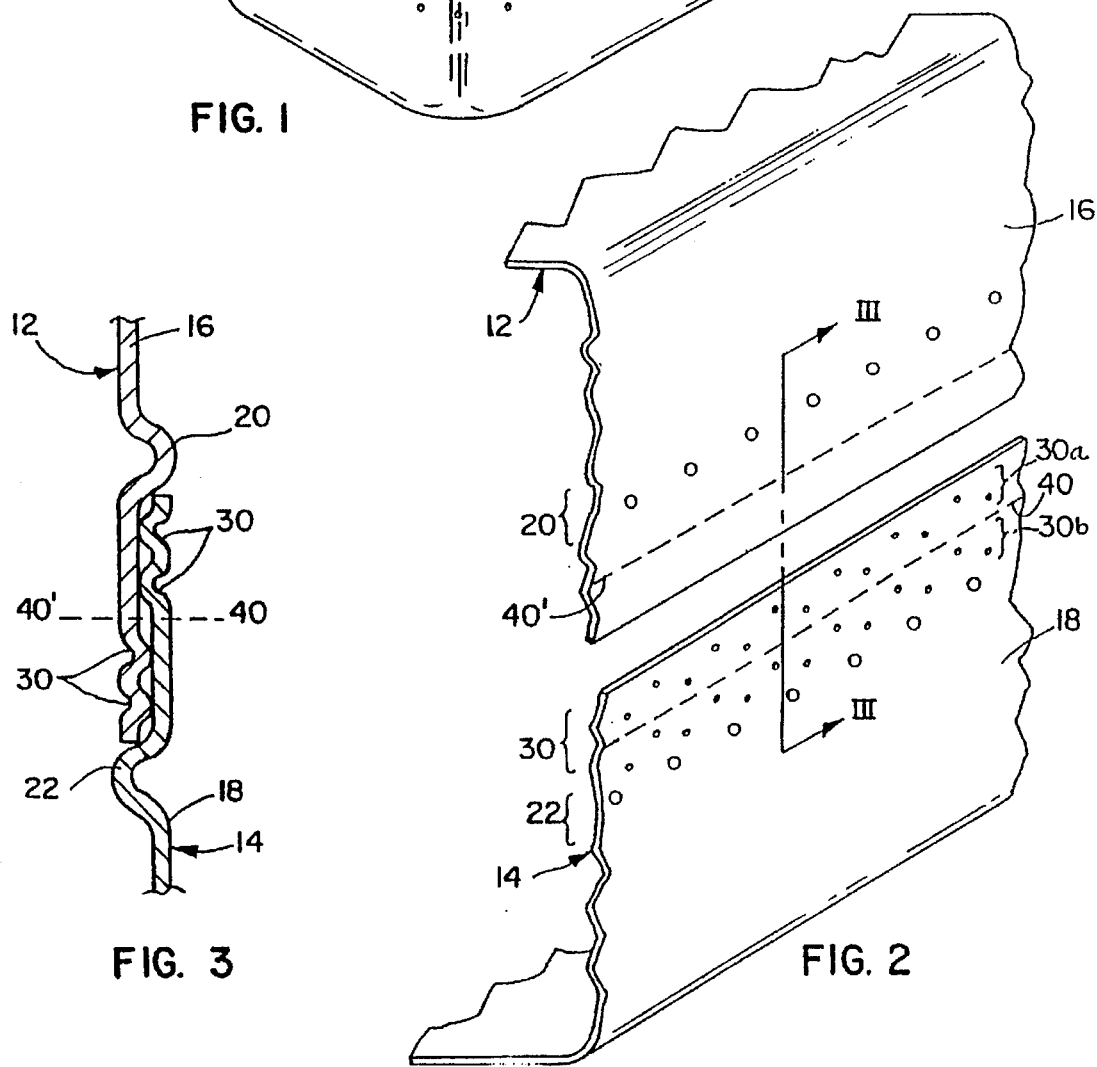

1

FLANGELESS FUEL TANK

This is a divisional of application Ser. No. 08/140,664, filed Oct. 21, 1993 (now U.S. Pat. No. 5,454,480.

BACKGROUND OF THE INVENTION

The present invention relates to a welded flangeless container, and more specifically a steel fuel tank.

The preferred prior art method for manufacturing metal fuel tanks is to lap weld two tank halves along mating circumferential flanges formed into each. This method suffers in that the flanges, which extend outward from the tank, prohibit the tank body from extending to the full expanse of the opening designed to receive it. The circumference of the fuel tank body must be reduced in proportion to the size of the circumferential flange, thereby placing an undesired limit on the volume of the fuel tank.

To overcome this disadvantage, prior artisans have attempted to create a flangeless metal fuel tank. One problem in fabricating a flangeless tank is maintaining the two halves in alignment during welding. The top half wants to drop down "into" or "over" the bottom half-much like a box top on a box. Holding the tops consistently in registration has proven difficult.

A variety of coating materials such as zinc (Zn) are used to protect sheet metal from the hazards of exposure. These coatings generally have a vaporization temperature lower than the temperature necessary to weld the metal. As a result, the coatings vaporize and the resulting gas expands during the welding process. The expanding vapors can be trapped in pockets along the weld line or can blow out through the molten metal thereby creating defects along the weld line. In either case, the strength and leak-tight characteristics of the weld are adversely affected. This problem can be overcome by providing external communication with the weld location through the use of spacers or protrusions stamped along the weld line. The spacers or protrusions maintain a gap between the pieces to be welded and allow the expanding vapors to escape without adversely affecting the weld.

While the use of spacers or protrusions may solve the problem posed by the vaporization of metal coatings, each has shortcomings of its own. Spacers require the additional steps of fabrication and placement. Protrusions, in conjunction with the clamping force, have a tendency to cause the metal to bend or to deform. The clamping pressure causes the metal sheet to pivot at the point of contact between the protrusion and the adjacent metal sheet.

SUMMARY OF THE INVENTION

The aforementioned problems are solved by the present invention wherein a flangeless fuel tank includes locating protrusions to maintain the halves in registration and spacing dimples to vent the weld area. The tank halves are positioned by bringing a portion of their circumferential walls into overlapping disposition such that one of the circumferential walls receives the other. A gap between the overlapping portions of the two tank halves is maintained by an arrangement of dimples stamped into at least one of the tank halves. This gap provides a vent space which allows the escape of vaporized metal coatings. Preferably, the dimples are arranged in parallel rows to reduce bending of the metal under clamping force. To facilitate proper positioning of the tank halves, locating protrusions are stamped into the circumferential wall of at least one tank half. The protrusions are of substantially greater height than the spacing dimples, and define the overlap area between the two tank halves by contact with the exterior edge of the circumferential wall of the other tank half. Once the tank halves are positioned in registration, an electromagnetic force applies the clamping pressure, and the halves are welded along the overlapping portions.

The locator protrusions and spacing dimples provide both registration and venting by way of a simple and inexpensive, yet highly effective process. No additional pieces, such as spacers, are required. The present process permits the practical commercial fabrication of a welded flangeless fuel tank or other container.

These and other objects, advantages, and features of the present invention will be more fully understood and appreciated by reference to the detailed description of the preferred embodiment and the drawings.

BRIEF DESCRIPTION OF THE DRAWINGS

FIG. 1 is a perspective, exploded view of two tank halves to be welded in accordance with the present invention;

FIG. 2 is a fragmentary perspective view of a portion of the two tank halves to be welded in accordance with the present invention;

FIG. 3 is a fragmentary sectional assembly view taken along line III—III of FIG. 2, showing the overlapping disposition of the two tank halves;

DETAILED DESCRIPTION OF THE PREFERRED EMBODIMENT

Figure 5:
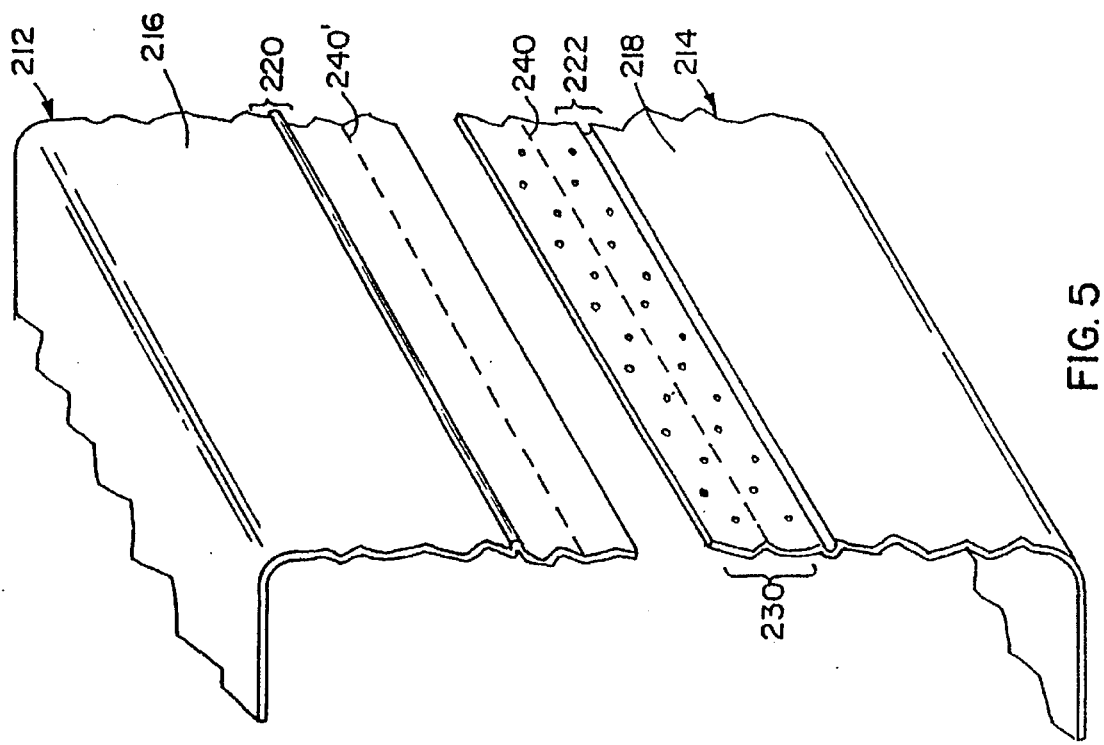
FIG. 5 is a fragmentary perspective view similar to FIG. 2 showing a second alternative embodiment of the present invention.

A flangeless fuel tank constructed in accordance with a preferred embodiment of the present invention is illustrated in FIG. 1 and generally designated 10. The fuel tank 10 is comprised of a lower female half 14 and an upper male 12 tank half, both of which are formed of zinc-coated sheet metal. The tank halves 12 and 14 are generally cup-shaped and are formed using conventional metal-stamping techniques. All described protrusions and dimples also are stamped into the tank halves. The halves 12 and 14 each include a bottom wall and a circumferential side wall 16 and 18 respectively. The two tank halves 12 and 14 interfit such that the circumferential wall 16 of the male tank half 12 is received within the circumferential wall 18 of the female tank half 14 (See FIG. 3). The circumferential walls 16 and 18 of each tank half 12 and 14 define an overlap area. Weld lines 40 and 40' on the two tank halves are centrally disposed within the overlap area and extend parallel to the exterior edge of the circumferential wall 16 and 18. When interfitted the weld lines are aligned and a weld is created along the aligned lines.

To facilitate proper alignment of the two tank halves 12 and 14, locating protrusions 20 and 22 are stamped into the circumferential wall 16 and 18, respectively, of tank halves 12 and 14 (see FIGS. 2 and 3). When the two tank halves 12 and 14 are interfitted, the peripheral edge of each circumferential wall 16 and 18 abuts against the protrusions 20 and 22 stamped within the other circumferential wall 16 and 18 (See FIG. 3). This abutting disposition defines and maintains an area of overlap between the two tank halves 12 and 14.

As shown in FIGS. 1 and 2, the locating protrusions 20 and 22 of a preferred embodiment are each comprised of a single row of relatively large dimples. In the preferred embodiment, the height of protrusions 20 and 22 with 0.042-gauge metal is 0.125 inch. The protrusions 20 stamped into the male tank half 12 extend toward the exterior of the fuel tank 10 to abut against the circumferential wall 18 of the female tank half 14 (See FIG. 3). The protrusions 22 stamped into the female tank half 14 extend toward the interior of the fuel tank 10 to abut against the circumferential wall of the male tank half 12 (See FIG. 3). The two rows of protrusions 20 and 22 run parallel to the exterior edge of the circumferential wall 16 and 18, and are disposed a substantially identical distance therefrom. This disposition ensures that the two circumferential walls 16 and 18 will simultaneously contact the corresponding row of protrusions 20 and 22.

To provide vent space for escaping gases in the welding of these coated metals, an arrangement of dimples 30 are stamped into the circumferential wall 18 of at least one of the tank halves. As illustrated, all of the dimples 30 are formed in the lower tank half 14. Alternatively, selected simples could be formed in both or either tank halves. In the preferred embodiment depicted in FIG. 2, the dimples 30 are arranged into rows 30a and 30b which run parallel to and adjacent the weld line 40. Two rows of dimples 30 are included on each side of the weld line 40 to provide more than a single line of spacing contact between the overlapping portions of the tank halves 12 and 14 in the area subjected to clamping force. This arrangement decreases the deformation which results from clamping by reducing the metal's tendency to pivot and buckle in the area subjected to the clamping force. The first pair of rows 30a is located between the weld line 40 and the exterior edge of the circumferential wall 18. The second pair of rows 30b are spaced from the weld line 40 on the side opposite the first two rows 30a. The dimples 30 in the two rows of each pair are offset from one another, which further reduces metal deformation. The dimples 30 in the exemplary 0.042-gauge steel are 0.125 inch high.

Once the two tank halves 12 and 14 are properly interfitted such that they are supported by the locating protrusions 20 and 22, electromagnetism is used as the clamping force to secure the tank halves 12 and 14 for welding. Such clamping is generally well known to those having skill in the welding art. A laser beam welding apparatus (not shown but well known) welds the clamped tank halves 12 and 14 along the aligned weld lines 40 and 40' to create a continuous weld (not shown). After welding is complete, the clamping force is released.

Although not specifically discussed above, the upper tank half may include a hole for receiving a sending unit as known to those skilled in the art.

Figure 4:
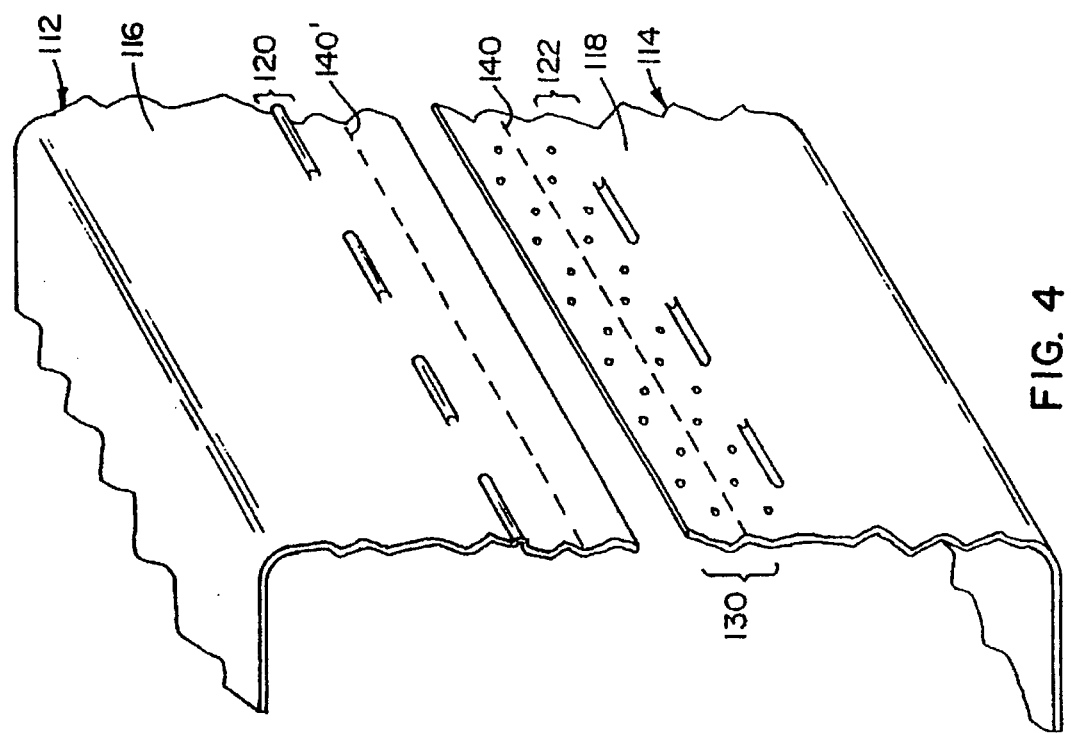
FIG. 4 is a fragmentary perspective view similar to FIG. 2 showing a first alternative embodiment of the invention.

A first alternative embodiment of the present invention is illustrated in FIG. 4 and is generally similar to the FIGS. 1–3 embodiment. Identical components are identified by the same designating numeral preceded by "1" (e.g. 12 becomes 112). The only difference is protrusions 120 and 122, which are intermittent linear segments. The segments extend parallel to the exterior edge of the circumferential wall 16 and 18 and are linearly aligned. A second alternative embodiment is shown in FIG. 5 and again is generally similar to the FIGS. 1–3 embodiment. The locating protrusions 20 and 22 are each comprised of a single continuous ridge extending around the entire periphery of the tank halves 12 and 14, respectively. These two alternative embodiments provide reduced vent space in trade-off for increasingly positive registration.

The above descriptions are those of preferred embodiments of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A method for producing a flangeless tank by interfitting and welding together a male and female tank half, wherein at least one of said tank halves is coated with a material having a vaporization temperature lower than the temperature necessary to weld said tank halves, the method comprising the steps of:

stamping at least one of said tank halves with an arrangement of spacing dimples along a weld line;

stamping said tank halves with locating protrusions of substantially greater depth than said spacing dimples and in such a manner that said locating protrusions are disposed adjacent to said arrangement of spacing dimples on the side longitudinally opposite the exterior edge of said tank halves, said locating protrusions on said male tank half extending toward the exterior of said flangeless fuel tank, and said locating protrusions on said female tank half extending toward the interior of said flangeless fuel tank;

interfitting said fuel tank halves such that said male tank half is received within said female tank half up to the extent that said female tank half abuts with said locating protrusions of said male tank half and said male tank half abuts with said locating protrusions of said female tank half, thereby defining an overlap position having the weld line disposed circumferentially thereon, the spacing dimples maintaining a vent space between the two tank halves;

applying an electromagnetic clamping means to forcibly secure said tank halves, said electromagnetic clamping means comprised of two distinct electromagnetic clamping heads disposed in such a manner as to allow access to said weld line; and laser beam welding said tank halves along the entire length of said weld line.

2. A method for producing a flangeless tank as defined in claim 1 wherein said arrangement of dimples is comprised of four rows of dimples disposed substantially parallel to said weld line and being of substantially lesser depth than said locating protrusions; said four rows of dimples having a first pair of rows disposed on the same longitudinal side of said weld line and a second pair of rows of dimples disposed on the longitudinal side of said weld line opposite said first two rows.

3. A method for producing a flangeless tank as defined in claim 1 wherein said locating protrusions are further defined as a row of dimples disposed substantially parallel to said weld line.

4. A method for producing a flangeless tank as defined in claim 1 wherein said locating protrusions are further defined as a row of intermittent dashes disposed substantially parallel to said weld line.

5. A method for producing a flangeless tank as defined in claim 1 wherein said locating protrusions are further defined as a continuous trough extending longitudinally around said circumferential walls and substantially parallel to said weld line.

6. A method of fabricating a flangeless fuel tank of coated metal comprising:

forming first and second cup-shaped tank halves each having a peripheral wall terminating in an edge;

forming locator protrusions in at least one of the peripheral walls;

forming spacing dimples in at least one of the peripheral walls, the spacing dimples being of lesser height than the locator protrusions;

interfitting the tank halves until the terminal edge of the other wall engages the locator protrusions in the one wall, the dimples engaging the other wall to provide a vent space between the walls; and welding the walls together in the area of the dimples, whereby vaporized coatings are vented through the vent space.

7. A method as defined in claim 6 wherein said locator protrusions are formed in both of the walls.

8. A method as defined in claim 6 wherein said locator protrusions are arranged in a line.

9. A method of fabricating a flangeless container comprising:

forming two cup-shaped container halves from coated metal each including a peripheral side wall terminating in an edge;

forming a plurality of locator protrusions arranged in a line in one of the peripheral walls;

forming a plurality of spacing dimples in one of the peripheral walls, the spacing dimples being of lesser height than the locator protrusions;

interfitting said container halves until the edge of the other peripheral wall engages the locator protrusions in the one side wall, the spacing dimples engaging the other container half to define a vent space; and welding the side walls together with vaporized coatings created during said welding step escaping through the vent space.

10. A method as defined in claim 9 wherein said second forming step comprises forming the protrusions in both of the peripheral walls.

* * * * *